May 27, 1969

J. N. MALLIS 3,446,748

FS-SMOKE AGENT INHIBITOR FOR METALS

Filed Oct. 22, 1965

INVENTOR
JAMES N. MALLIS

BY Claude Hunkhouser

ATTORNEY

United States Patent Office 3,446,748
Patented May 27, 1969

3,446,748
FS-SMOKE AGENT INHIBITOR FOR METALS
James N. Mallis, Fredericksburg, Va., assignor to the United States of America as represented by the Secretary of the Navy
Filed Oct. 22, 1965, Ser. No. 502,731
Int. Cl. C23f 11/04; C06d 3/00
U.S. Cl. 252—387    8 Claims

ABSTRACT OF THE DISCLOSURE

The addition of less than 1% of red lead oxide, and preferably 0.04% to 0.10%, to a mixture of approximately 45% chlorosulfonic acid and 55% sulfur trioxide inhibits the tendency of mixture to corrode aluminum and/or steel in tanks containing the mixture.

---

The invention described herein may be manufactured and used by or for the Government of the United States of America for governmental purposes without the payment of any royalties thereon or therefor.

This invention is directed to a corrosion inhibitor to be used in connection with tanks designed for the specific purpose of containing the FS smoke mixture.

The tanks used to contain the FS smoke mixture are of two types, the main tank which is usually of light weight steel and the spherical tanks which are small and are of aluminum. The FS smoke mixture is a combination of approximately 45% chlorosulphonic acid and 55% of sulfur trioxide. The storage of this mixture in the tanks causes the problem of corrosion of the metal of the tanks. The ordinary life of both the large tank and the small spherical tanks is limited to two years and any of the mixture which is stored for more than two years must be changed to other tanks or disposed of. This is but part of the problem as in order to have a safety factor in the use of the tanks, it is necesary to make the tanks of a heavier metal than would be necessary if there was no corrosion problem. The use of a corrosion inhibitor permits the use of lighter weight tanks and makes it possible to carry larger loads of the mixture.

The object of the present invention is to provide an additive which may be added to the solution of chlorosulphonic acid and sulfur trioxide and which will coat the inner surface of the larger tank and will coat both the outer and inner surfaces of the smaller tanks.

It is another object of the present invention to provide an additive in the form of red lead oxide which when added to the solution will chemically react and coat the surfaces which are exposed to the mixture.

It is a further object of the invention to provide an additive which is low in the EMF scale so that there will be chemical action which will coat the surfaces exposed to the mixture with the metal of the additive.

A still further object of the present invention is to provide an additive which may be used in comparatively small quantities in the nature of less than 1% of the mixture.

It is a still further object of the present invention to provide an additive of red lead oxide in quantity equal to less than 1% of the mixture of approximately 45% chlorosulphonic acid and 55% sulfur trioxide and to use this additive as an inhibitor against corrosion in tanks made of metals higher in the EMF series than the lead.

The invention is illustrated in the accompanying drawing in which.

Figure 1:
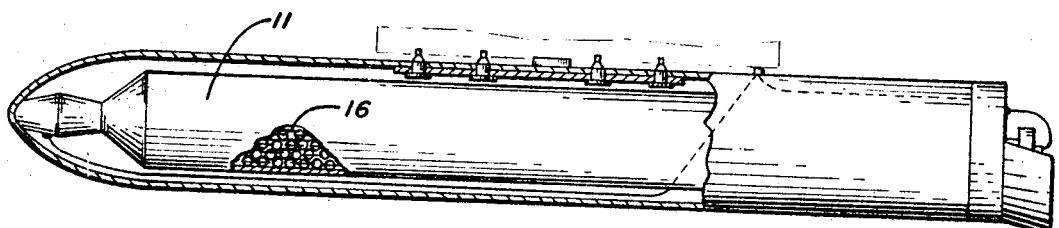
FIG. 1 is a plan view of the large tank container.
Figure 2:
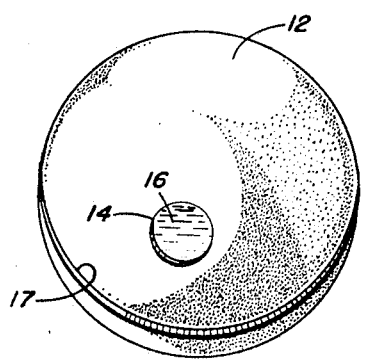
FIG. 2 is a view of one of the small tanks housed within the larger tank.
Figure 3:
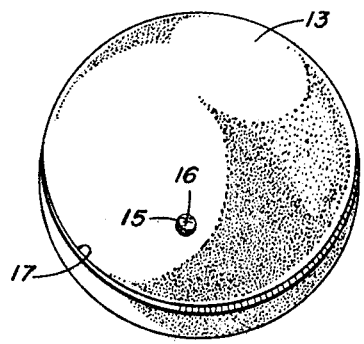
FIG. 3 is a view of another small tank slightly different from that shown in FIG. 2.

The FS smoke mixture is dispersed from airplanes to provide a smoke screen or curtain of smoke extending from the ground to a height of approximately 300 feet. It is used to cover the movement of ships at sea or troops on the ground. It is provided by dispensing the liquid mixture from the larger tank as a liquid and contained within the smaller spherical tanks. The smoke screen produced comprises three overlapping strata. The upper stratum is produced by the smoke agent surrounding the aluminum spheres within the chemical tank. Smoke agent escaping from the spheres having the larger (one-half inch diameter) holes produces the second stratum or smoke streamers. The lower stratum is produced by the smoke agent escaping from the spheres having the smaller (one-eighth inch diameter) holes when these units break open on ground impact. These strata move together to form a continuous smoke screen.

The tank is operated through an electrical detonator in the nose cone of the tank and an impulse cartridge in an explosive bolt of the rear. When the detonator and impulse cartridge are detonated the tank is opened at both ends, releasing the spheres and smoke agent at the rear. Both the smoke agent and the spheres are deflected downward, away from the aircraft by the slipstream.

Referring to the drawing, the large tank 11 is attached to the understructure of an airplane. It is filled with the empty aluminum spherical tanks 12 and 13. The tanks 12 and 13 are formed of hemispheres joined by seam 17, and differ from each other by the size of the opening which is shown at 14 in tank 12 and at 15 in tank 13. This opening permits the tanks to be filled and to empty the contents during the descent to the ground and after hitting the ground. The large tank is filled with the mixture 16 under the influence of a reduced pressure permitting the numerous spherical tanks which are within the larger tank to be filled at the same time.

If this filling takes place and the tanks are not used for a considerable period, corrosion takes place. Both the aluminum spherical tanks and the larger steel tank are subject to the corrosive effect of the FS smoke mixture. This corrosive action is neutralized by the addition of an additive to the mixture before it is pumped into the larger tank. This additive is red lead oxide and is added in the amount of less than one percent of the total mixture. It has been found by experiment that the addition of red lead oxide in the amount of 0.04% is sufficient to deter the corrosive action of the FS smoke mixture.

The following chemical equation demonstrates the chemical action taking place:

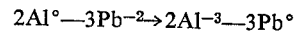
$$2Al° - 3Pb^{-2} \rightarrow 2Al^{-3} - 3Pb°$$

where Al° and Pb° denote the metallic state.

Because of the relative position of the metals in the EMF series, the dissolved lead in the mixture replaces the surface aluminum and steel thus coating the surfaces exposed to the FS smoke mixture. As lead is inert and not corroded by the mixture, the life of the tanks is extended indefinitely.

What is claimed is:

1. A mixture comprising approximately 45% chlorosulfonic acid, 55% sulfur trioxide and less than 1% red lead oxide.

2. The mixture of claim 1 comprising from 0.04% to 0.10% red lead oxide.

3. A method of inhibiting corrosion in aluminum tanks which contain a mixture of approximately 55% chlorosulfonic acid and 45% sulfur trioxide, consisting of adding less than 1% of red lead oxide to the mixture.

4. The method of claim 3 in which the percentage of red lead oxide added is from 0.04% to 0.10%.

5. The method of inhibiting corrosion in steel tanks which contain a mixture of approximately 55% chlorosulfonic acid and 45% sulfur trioxide, consisting of adding less than 1% of red lead oxide to the mixture.

6. The method of claim 5 in which the percentage of red lead oxide added is from 0.04% to 0.10%.

7. A method of inhibiting corrosion in tanks which are comprised of both steel and aluminum and which contain a mixture of approximately 55% chlorosulfonic acid and 45% sulfur trioxide, consisting of adding less than 1% of red lead oxide to the mixture.

8. The method of claim 7 in which the percentage of red lead oxide added is from 0.04% to 0.10%.

References Cited

UNITED STATES PATENTS 2,985,539  5/1961  Konig _____ 106—41 X

OTHER REFERENCES

Merck Index, Merch and Company, 1960, p. 247, Condensed Chemical Dictionary, Reinhold, 1961, p. 434.

Evans, U. R., Introduction to Metallic Corrosion, Edward Arnold and Company, 1948, pp. 161 and 166.

Speller, F. N., Corrosion Causes and Prevention, McGraw-Hill, 1951, pp. 8–10 and 25.

LEON D. ROSDOL, *Primary Examiner.*

I. GLUCK, *Assistant Examiner.*

U.S. Cl. X.R.

102—66, 90; 106—14; 117—127; 252—305